Figure 1:
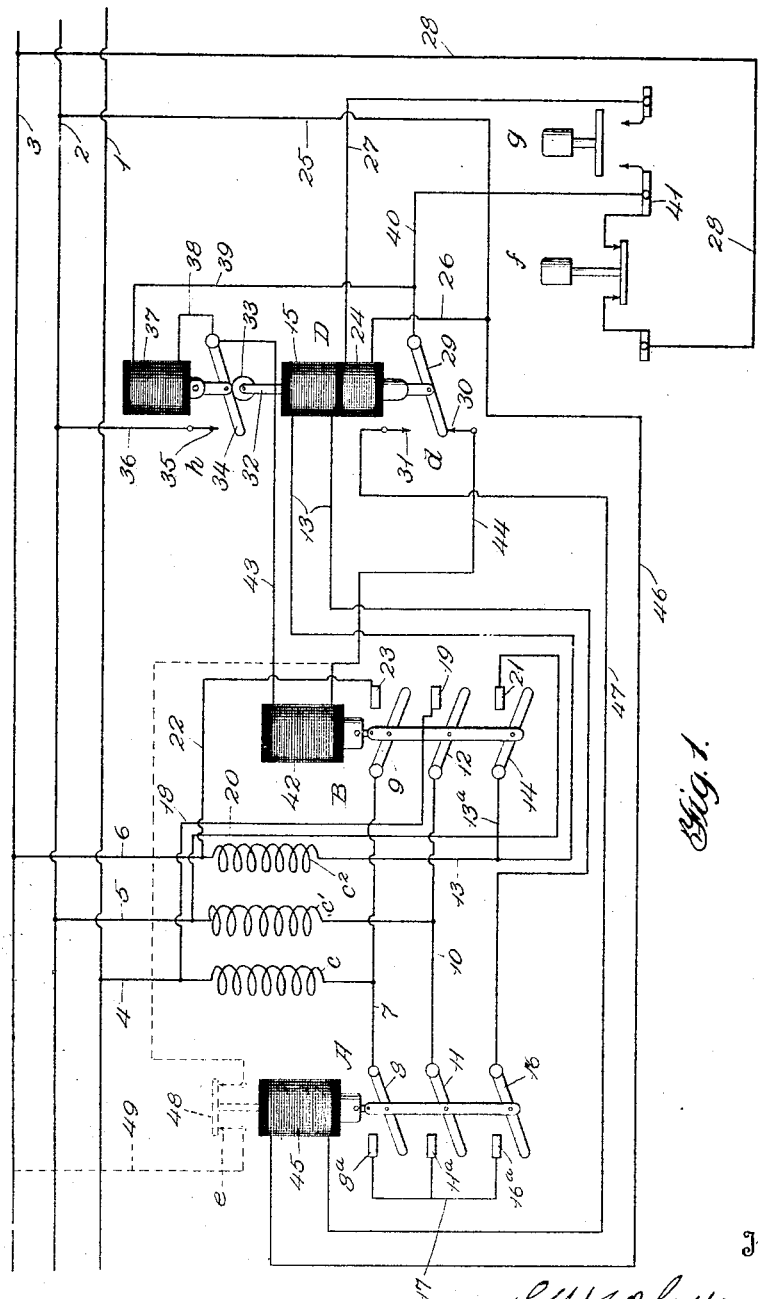

Jan. 26, 1926.

G. H. WHITTINGHAM 1,571,152

MOTOR STARTING SWITCH

Filed Dec. 22, 1923    2 Sheets-Sheet 1

Inventor
G. H. Whittingham
By
Robert Watson
Attorney

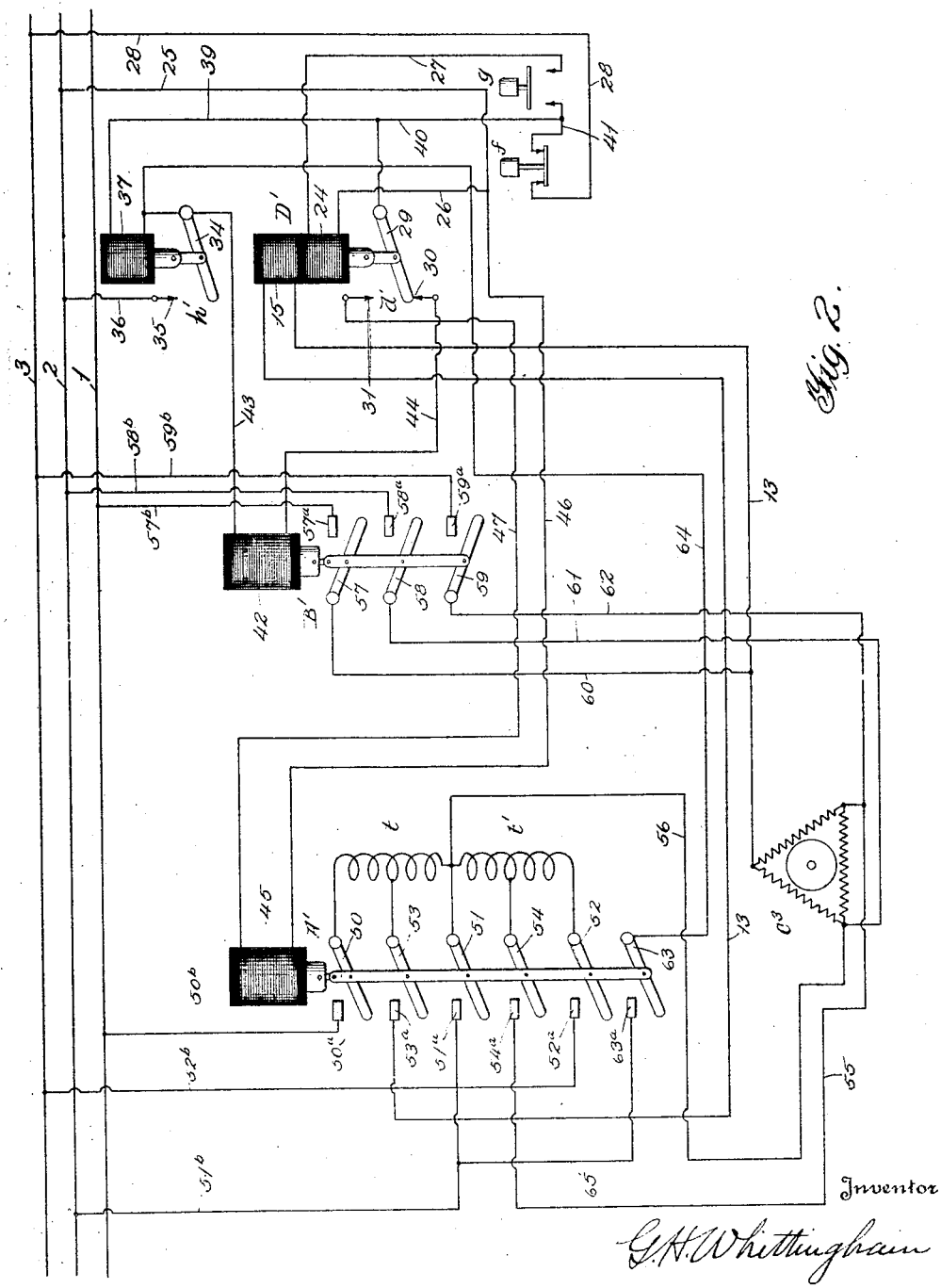

Patented Jan. 26, 1926.

1,571,152

UNITED STATES PATENT OFFICE.

GEORGE H. WHITTINGHAM, OF BALTIMORE, MARYLAND, ASSIGNOR TO MONITOR CONTROLLER COMPANY, OF BALTIMORE, MARYLAND, A CORPORATION OF MARYLAND.

MOTOR-STARTING SWITCH.

Application filed December 22, 1923. Serial No. 682,205.

*To all whom it may concern:*

Be it known that I, GEORGE H. WHITTINGHAM, a citizen of the United States, residing at Baltimore, in the State of Maryland, have invented certain new and useful Improvements in Motor-Starting Switches, of which the following is a specification.

This invention relates to a distant control for starting induction motors, and it comprises, in connection with an electro-magnetic starting switch, for making proper connections of the motor windings for starting and a similar running switch for making the connections to said motor for normal running, a relay controlled by a push button switch, for closing the circuit of the magnet of the starting switch, said relay operating with a retarded action to open the circuit of said magnet when the starting current in the motor falls to a predetermined amount, and means controlled by the relay, or by the starting switch, for then closing the circuit of the magnet of the running switch. The relay is provided with a primary energizing coil, the circuit of which is momentarily closed by a push button switch, when it is desired to start the motor, and it is also provided with a coil in series with a winding of the motor, for causing a delayed opening of the starting switch and closure of the running switch. In order to start the motor, it is simply necessary for the operator to momentarily close the push button switch and the timing of the operation of the starting and running switches is then automatically regulated by the relay.

In the accompanying drawing,

Fig. 1 is a diagrammatic view, showing the invention in connection with starting and running switches for making the star and delta connections, respectively, of the motor windings; and, Fig. 2 is a similar view showing the invention in connection with the transformer type of starting switch.

Referring to Fig. 1 of the drawing, $c$, $c'$, and $c^2$, indicate windings of a three-phase induction motor, which windings are connected to the supply wires 1, 2, and 3 by leads 4, 5, and 6, respectively. An electromagnetic starting switch for making a star connection of the motor windings is indicated at A. An electro-magnetic running switch for making a delta connection of the windings for normal running is indicated at B. One terminal of the winding $c$ is connected by conductor 7 to the arm 8 of switch A and the arm 9 of switch B. One terminal of the winding $c'$ is connected by conductor 10 to arm 11 of switch A and to arm 12 of switch B, and one terminal of winding $c^2$ is connected by conductor 13 and branch 13ª to arm 14 of switch B, and this conductor 13 extends to a low resistance coil 15 on relay D, and thence to switch arm 16 of switch A. The switches A and B are normally open. When the switch A is closed, its several arms 8, 11 and 16, are electrically connected together by conductor 17, which is connected to the several stationary contacts 8ª, 11ª, and 16ª, and thus the terminals of the motor windings which are connected to the conductors 7, 10, and 13 will be electrically connected together, with the coil 15 of the relay in series with the motor winding $c^2$. When the switch A is open and the switch B is closed, the lead 4 which extends to one terminal of the coil $c$ will be connected by conductor 18 to stationary contact 19 and through switch arm 12 and conductor 10 to one terminal of coil $c'$; the opposite terminal of coil $c'$, to which the lead 5 is connected, will be connected by conductor 20 to contact 21 of switch B, and thence by switch arm 14 and conductor 13 to one terminal of winding $c^2$; the opposite terminal of winding $c^2$ will be connected by conductor 22 to contact 23 of switch B, and thence through switch arm 9 and conductor 7 to the winding $c$. Thus, the delta connection of the windings, for normal running, will be maintained as long as the switch B is closed.

Electro-magnetic switches, for changing the connections of the windings of induction motors, as conventionally illustrated in Fig. 1 of the drawing, are old and well known; but, generally, the timing of operation of the switches to change the connections from star to delta is left to the judgment of the operator. My invention relates to a means for controlling the switches so that the change in the connections of the motor windings will be delayed until the starting current falls to normal, when the switches will be automatically operated to change the connections. For this purpose, I provide a current-retarded relay switch D, having the coil 15 in series with the motor windings, as before described, and having a coil 24 which is connected to the supply wires 2 and 3 through a normally open push button switch $g$. Thus, the circuit of the coil 24 extends by conductor 25 from the supply wire 2 to conductor 26, leading to one terminal of said coil, and from the other terminal of said coil, conductor 27 leads to the normally open push button switch $g$, thence through normally closed push button switch $f$, and thence by conductor 28 to supply wire 3. When the switch $g$ is closed, the relay magnet, which is in the form of a solenoid, attracts its core and raises a switch arm 29 from a fixed contact 31. A rod 32, projecting from the upper end of the core of the relay solenoid carries a roller 33 which is arranged beneath a switch arm 34 of an electro-magnetic holding switch $h$, which is normally open. When the relay magnet core lifts, it causes the switch arm 34 to engage a fixed contact 35, which is connected by conductor 36 to the supply wire 2. A holding magnet 37 is provided for holding the switch $h$ closed after the switch arm 34 has been mechanically raised by the relay magnet. When the switch $h$ is closed, a circuit is closed through the holding magnet as follows: From conductor 2, through conductor 36 to switch $h$, thence through conductor 38 to magnet 37, thence through conductors 39 and 40 to conductor 41, between the push button switches $f$ and $g$, thence through the normally closed push button switch $f$, and through conductor 28 to supply wire 3. Thus, after the switch $h$ has been closed, the current flowing through the coil of magnet 37 will keep it closed until the push button switch $f$ is depressed to open the circuit through said coil. The closure of the switch $h$ also connects one terminal of the magnet coil 42 of switch B to supply wire 2, through conductor 43, which is connected to the switch arm 34. The other terminal of the coil of magnet 42 is connected by conductor 44 to the lower stationary contact 30 of the relay switch $d$ and when the switch arm 29 engages said contact, the wire will be connected through said switch arm and conductors 40, 41, and 28 to the supply wire 3. The circuit through the magnet coil 42 is normally open at the switch $h$ and closed at the switch $d$. When the relay coil 24 is energized, by closing its circuit through the push button switch $g$, the switch arm 29 is moved out of engagement with the contact 30 by the relay before the switch $h$ is closed, and thus, no current can flow through the coil 42 until the arm 29 drops back on to the contact 30. This return of the relay switch arm is controlled by the current in the coil 15 of the relay.

The circuit of the magnet 45 of the starting switch A is normally open at the relay switch $d$, but is closed when the relay is energized and the switch arm 21 is in engagement with the contact 31. The circuit for the magnet 45 extends from the supply wire 2, through conductors 25 and 46 to the coil of magnet 45, thence through conductor 47 to the upper stationary contact 31 on the relay switch. When the switch arm 29 is closed against said contact, the circuit proceeds through said switch and conductor 40 to the normally closed push button switch $f$, and thence through conductor 28 to the supply wire 3.

The operation of the apparatus shown in Fig. 1 is as follows: To start the motor, the operator depresses the push button switch $g$, momentarily, and this permits current to flow through the coil 24 of the relay magnet. This magnet thus becomes initially energized and its core lifts, causing the arm 29 of the relay switch $d$ to move away from the contact 30 and into engagement with the contact 31, and after said arm has moved away from the contact 30, the holding switch $h$ is closed by the relay. Thus, the circuit of the magnet 42 is closed at the switch $h$, but left open at the switch $d$, while the arm 29 is in engagement with the contact 31. The engagement of the arm 29 with the contact 31 closes the circuit through the coil of magnet 45 and this magnet is energized and closes the switch A, which makes the star connection of the motor windings, and the motor starts. As the coil 15 of the relay magnet is in series with the motor windings, through the switch A, the relay magnet will be energized by the current flowing through the motor while the latter is starting, and this will cause the arm 29 of the switch $d$ to remain in contact with the contact 31, through which the current to the magnet 45 of the starting switch flows. As the speed of the motor increases, the current in these windings and in the coil 15 of the relay will decrease and when the current drops to a predetermined amount, the relay magnet will no longer support its core and the latter will drop, thereby causing the circuit of the magnet 45 to be opened at the switch $d$ and the circuit of the magnet 42 to be closed at said switch by the engagement of the arm 29 with the contact 30. When the circuit of the magnet 45 is opened, the starting switch A drops to open position and this interrupts the circuit through the coil of the relay. As the magnet 42 immediately thereafter becomes energized, this magnet causes the switch B to close, thereby making the proper connections of the motor windings for normal running. The holding magnet 37 keeps its own circuit closed at the switch $h$ after said switch has been closed by the relay, and during the time that the motor is running. When it is desired to stop the motor, the normally closed push button switch $f$ is pressed open momentarily and this interrupts the circuit through the coil of the holding magnet 37. This magnet thereby becomes de-energized and its core drops, causing the holding switch $h$ to open and interrupt the circuit of the holding magnet as well as the circuit of the magnet 42 which controls the running switch B. When the magnet 42 is de-energized its core drops, causing the switch B to open and break the connections to the motor windings, causing the stoppage of the motor.

Instead of having the relay switch close the circuit of the magnet 42 when the relay core drops, this circuit may be closed by a switch indicated in dotted lines at $e$. Thus, by providing a contact member 48, which is movable with the core of the magnet 45, and a conductor 49 leading from the supply wire 3 through the switch $e$, to the conductor 44, the circuit of the magnet 42 will be open at the switch $e$ when the core of the starting switch A is in raised position, and when its core drops to open the starting switch, the contact member 48 will close the switch $e$ and the coil 42 will be energized and will operate to close the switch B.

In Fig. 2, I have shown the invention associated with a transformer type of starter, and, in this view also, I have shown a means controlled by the starting switch for causing the closure of the holding or retaining switch, instead of causing the switch to be closed by the retarding relay as in Fig. 1. In Fig. 2, the circuits for the push button switches and the magnets of the retarding relay, the starting and running switches, and the magnet which controls the holding or retaining switch are the same as in Fig. 1, and the circuits are indicated by the same reference numerals.

In Fig. 2, the stator windings of an induction motor are shown at $c^3$, and the coils of a transformer starter are shown at $t$ and $t'$. The starting switch A' comprises the switch arms 50, 51, and 52, movable by the magnet 45 to connect the terminals of the transformer coils to the supply wires 1, 2, and 3, respectively, and it also comprises the switch arms 53 and 54, for connecting intermediate portions of the coils $t$ and $t'$ to the motor windings. This switch is normally open and, when closed, the arms 50, 51 and 52 engage contacts $50^a$, $51^a$, and $52^a$, which are connected to the supply wires 1, 2, and 3 by leads $50^b$, $51^b$, and $52^b$, respectively. The switch arm 53, connected as shown to a central point on the coil $t$, is adapted to engage the contact $53^a$, and from this contact the conductor 13 leads to the coil 15 on the retarding relay and thence to the windings of the motor. The switch arm 54, which is connected to the central part of the coil $t'$ is adapted to engage the contact $54^a$, which is connected by a conductor 55 to the motor windings, and a conductor 56 leads from a point between the coils $t$, $t'$ to the motor windings. It will be evident from this arrangement that when the switch A' is closed, the motor windings will be connected to the supply circuit through sectional parts of the transformer which will cause about one-half of the line voltage to be applied to the terminals of the motor coils, for starting.

The running switch B' comprises the switch arms 57, 58, and 59, adapted to engage contacts $57^a$, $58^a$, and $59^a$, respectively. This switch is normally open, and is movable to closed position by the magnet 42. The contacts $57^a$, $58^a$, and $59^a$ are connected to the supply wires 1, 2, and 3, by conductors $57^b$, $58^b$, and $59^b$, respectively, and the switch arms 57, 58, and 59 are connected to the terminals of the motor windings by conductors 60, 61, and 62, respectively. It will be evident from this that when the switch B' is closed, the motor windings will be connected directly to the supply circuit through this switch.

On the starting switch, I have shown an extra contact arm 63, adapted to engage a contact 64 when the switch is closed, and this contact is connected to the supply wire 2, through conductors 65 and $51^b$. The switch arm 63 is connected by conductor 64 to the coil of magnet 37 which operates the holding or retaining switch $h'$.

The operation of the apparatus shown in Fig. 2 is as follows: Normally, the various parts are in the position shown in the drawing. When the normally open push button switch $g$ is momentarily pressed to its closed position, the magnet coil 24 of the retarding relay will be energized by current flowing from supply wire 3, through conductor 28, push button switches $f$ and $g$, conductor 27, magnet coil 24, and conductors 26 and 25 to the supply wire 2. The retarding relay will then operate to move the switch arm 29 into engagement with the contact 31 and current will then flow from supply wire 3, through conductor 28 and the normally closed push button switch $f$ to conductor 40 and switch arm 29, contact 31 and conductor 47 to magnet 45, and thence through conductors 46 and 25 to the supply wire 2. The magnet 45 will immediately close the starting switch A' and the motor coils will be connected to the transformer as previously described. The closure of the starting switch will also cause the additional contact arm 63 thereon to close a circuit through the magnet 37, which will cause the retaining switch $h'$ to close. This circuit extends from conductor 2, through conductors $51^b$ and 65 to contact 64, thence through switch arm 63 and conductor 64 to the coil 37, thence through conductors 39 and 40 to the conductor 41, thence through the normally closed switch $f$ and conductor 28 to the supply wire 3. When the retaining switch $h$ closes, it makes up a circuit for its own coil, so that the switch will remain closed after the starting switch has opened. It also connects one terminal of the magnet 42 to the supply wire 2, through conductor 43, which is connected to the switch arm 34. As shown, when the arm 34 engages the contact 35, the circuit through the magnet 37 will be completed from conductor 2, through conductor 36 and the switch $h'$, thence through the coil 37, conductors 39 and 40, switch $f$ and conductor 28 to the supply wire 3. The magnet 42 will also be connected to the supply wire 2, but no current will flow through the magnet 42 until the retarding relay permits the switch arm 29 to drop away from the contact 31 and into engagement with the contact 30. As the coil 15 of the retarding relay is in series with the motor windings, the current flowing in this coil will energize the relay sufficiently to hold the switch arm 29 in engagement with the contact 31 until the motor has started and the current in the coil 15 has dropped to a predetermined value. When this occurs, the arm 29 drops on to the contact 30, thus breaking the circuit through the magnet 45 of the starting switch and completing the circuit of the magnet 42 of the running switch. The starting switch accordingly opens and this is immediately followed by the closure of the running switch. When the starting switch opens, the circuit through the extra contact member 63 on the starting switch to the magnet 37 of the retaining switch is opened; but as the magnet 37 has at this time another circuit maintained through the switch $h'$, the latter remains closed and accordingly the circuit of the magnet 42 remains closed. When it is desired to stop the motor, the normally closed push button switch $f$ is depressed and this opens the circuit of the magnet 37. The switch $h'$ then immediately opens the circuit of the magnet 42 and the switch $B'$ drops to open position, thereby interrupting the motor circuits and causing the motor to stop.

What I claim is:

1. The combination with the windings of an induction motor, normally open starting and running switches for the motor and magnets for closing said switches, of a relay having a primary energizing coil and a retarding coil, the latter in a circuit including the motor windings and the starting switch, a normally open manually controlled switch for connecting said primary coil to the supply circuit, a switch movable by the relay and adapted, when said primary coil is energized, to close the circuit of the magnet of the starting switch, an electromagnetic holding switch adapted to connect one terminal of the magnet of the running switch to the supply circuit when said primary coil is energized and until the motor is stopped, and means for connecting the other terminal of the last mentioned magnet to the supply circuit when the current in the retarding coil reaches a predetermined value.

2. The combination with the windings of an induction motor, normally open starting and running switches for the motor and magnets for closing said switches, of a relay magnet having a primary energizing coil and a retarding coil, the latter in a circuit including the motor windings and the starting switch, a normally open manually controlled switch adapted to connect said primary energizing coil to the supply circuit, two switches operable by said relay magnet, one of said relay switches adapted to close the circuit of the magnet of the starting switch and the other adapted to connect one side of the circuit of the magnet of the running switch to the supply circuit when the primary energizing coil of the relay is energized, a holding magnet for holding said last-mentioned relay switch closed, and means for connecting the other side of the magnet of the running switch to the supply circuit when the current in the retarding coil reaches a predetermined value.

In testimony whereof I hereunto affix my signature.

GEORGE H. WHITTINGHAM.